United States Patent
Lee et al.

(10) Patent No.: US 6,922,198 B2
(45) Date of Patent: Jul. 26, 2005

(54) COLOR SIGNAL PROCESSING APPARATUS AND METHOD FOR REPRODUCING COLORS ON MPD

(75) Inventors: Sang-Jin Lee, Seoul (KR); Moon-Cheol Kim, Yongin-si (KR)

(73) Assignee: Samsung Electronics Co., LTD, Gyeonggi (KR)

( * ) Notice: Subject to any disclaimer, the term of this patent is extended or adjusted under 35 U.S.C. 154(b) by 0 days.

(21) Appl. No.: 10/840,608

(22) Filed: May 7, 2004

(65) Prior Publication Data

US 2004/0252130 A1 Dec. 16, 2004

(30) Foreign Application Priority Data

Jun. 5, 2003 (KR) .................................. 10-2003-0036362

(51) Int. Cl.$^7$ ................................................. G09G 5/02
(52) U.S. Cl. ........................ 345/603; 345/604; 345/569
(58) Field of Search ................................ 345/589, 593, 345/600, 603, 604; 382/162, 167; 358/518, 519, 520

(56) References Cited

U.S. PATENT DOCUMENTS

| | | | | |
|---|---|---|---|---|
| 5,463,480 A | * | 10/1995 | MacDonald et al. | 358/520 |
| 5,721,572 A | * | 2/1998 | Wan et al. | 345/590 |
| 6,229,626 B1 | * | 5/2001 | Boll | 358/518 |
| 6,268,930 B1 | * | 7/2001 | Ohta et al. | 358/520 |
| 6,538,742 B1 | | 3/2003 | Ohsawa | |
| 2002/0122207 A1 | * | 9/2002 | Klassen et al. | 358/518 |
| 2003/0043166 A1 | * | 3/2003 | Kumada et al. | 345/589 |

FOREIGN PATENT DOCUMENTS

| | | |
|---|---|---|
| JP | 11-069176 A | 3/1999 |
| JP | 2002-199231 A | 7/2002 |

* cited by examiner

Primary Examiner—Matthew Luu
(74) Attorney, Agent, or Firm—Sughrue Mion, PLLC

(57) ABSTRACT

A color signal processing apparatus and method calculate without errors a control vector that is a driving signal of a multi-primary display (MPD) corresponding to an input color signal in order to reproduce the input color signal on the MPD using at least four primary colors. The color signal processing apparatus includes: an XYZ color signal conversion unit; a parallel processing unit that obtains a polyhedron corresponding to a color gamut of the MPD in the CIE-XYZ color space based on an MPD Forward Model, divides the polyhedron into plural pyramids, and outputs intermediate values for calculating the control vector based on the plural pyramids; a restriction condition checking unit that outputs a valid value satisfying a physical restriction condition out of the calculated intermediate values and outputs an index for a pyramid for which the valid value is calculated; a pattern arrangement unit; and a control vector arrangement unit.

16 Claims, 10 Drawing Sheets

COLOR SIGNAL PROCESSING APPARATUS AND METHOD FOR REPRODUCING COLORS ON MPD

CROSS-REFERENCE TO RELATED APPLICATIONS

This application claims the benefit of Korean Patent Application No. 2003-36362, filed on Jun. 5, 2003, in the Korean Intellectual Property Office, the disclosure of which is incorporated herein by reference.

BACKGROUND OF THE INVENTION

1. Field of the Invention

The present invention relates to a color signal processing apparatus and method, and more particularly, to a color signal processing apparatus and method for calculating a control vector which is a driving signal for a multi-primary display (MPD) corresponding to an input color signal so that the input standard color signal is reproduced on the MPD using four or more primary colors.

2. Description of the Related Art

In general, color-reproducing devices such as monitors, scanners, printers, and so on, employ a different color space from one other according to their respective utilization areas, in which the color space is referred to as a method representing relations of a certain color with the other colors, that is, a method defining colors. Such color spaces include the RGB color space employed for color CRT monitors, computer graphic devices, and so on, the CMY color space for color image printing devices and the like, and the HSI color space for devices dealing with hue, saturation, and intensity, respectively. Further, there are the CIE color spaces used for defining device-independent colors which can precisely reproduce colors in any device, and the CIE color spaces typically include the CIE-XYZ color space, CIE L*a*b color space, CIE L*u*v color space, and so on.

In the meantime, the color-reproducing devices have different kinds of colors depending upon a color space used therefor, but, in general, use the basic three primary colors. That is, the three primary colors of red, green, and blue mixed with one another are used in the case that the RGB color space is used, and the three primary colors of cyan, magenta, and yellow are used in the case of the CMY color space.

Recently, there has been an attempt to stretch a color gamut by using four or more primary colors in color-reproducing devices, for an example of which there is a multi-primary display (MDP). The MPD refers to a display system using four or more primary colors to stretch a color gamut, that is, to extend a color-reproducing range more than the three-channel display system using the existing three primary colors. In order to reproduce a standard color signal using the three primary colors in such an MPD, there needs to be a color signal processing device for calculating a control vector, which is a driving signal of the MPD in correspondence to an input color signal.

Figure 1:
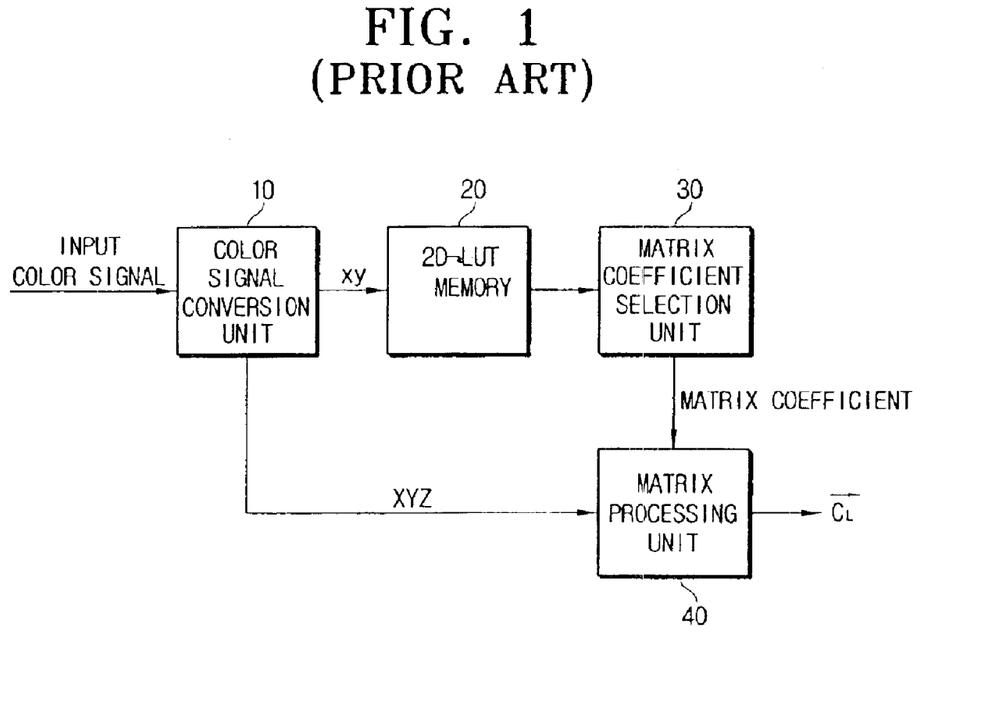
FIG. 1 is an exemplary block diagram for showing a conventional color signal processing apparatus.

FIG. 1 is a block diagram for showing an example of a conventional color signal processing apparatus. In FIG. 1, the conventional color signal processing apparatus has a color signal conversion unit 10, a 2D-LUT memory 20, a matrix coefficient selection unit 30, and a matrix processing unit 40.

Figure 2:
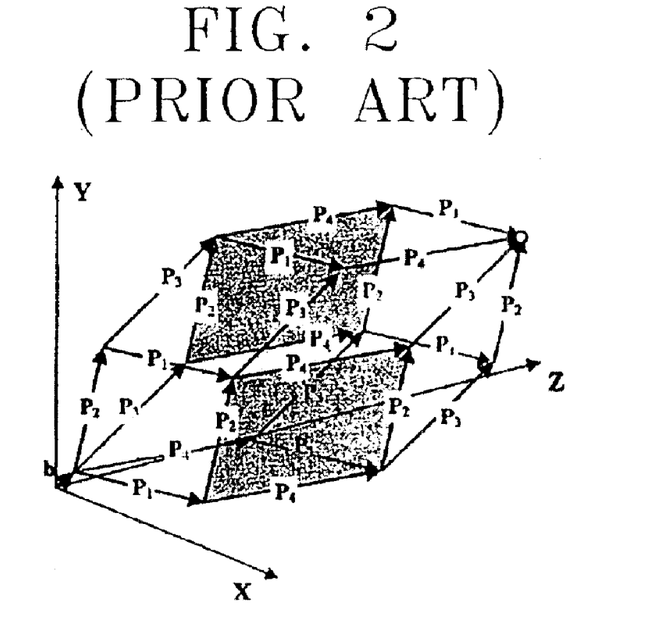
FIG. 2 to FIG. 4 are views for explaining operations of the conventional color signal processing apparatus.
Figure 3:
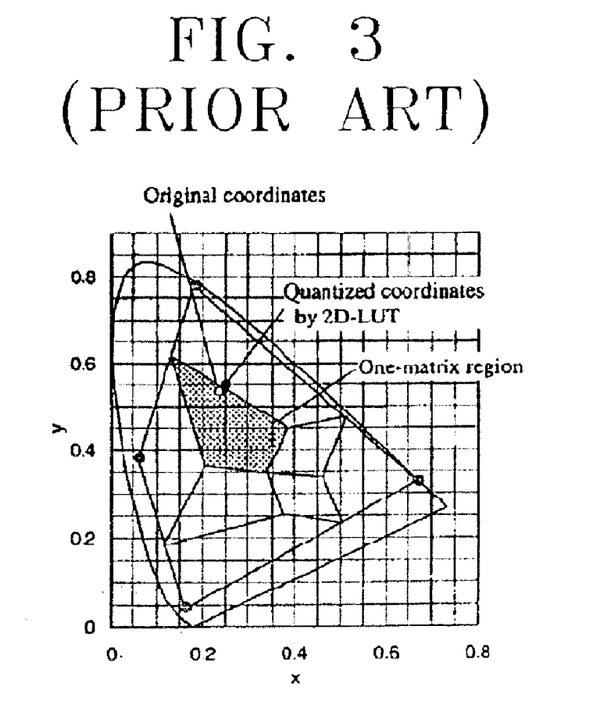
Figure 4:
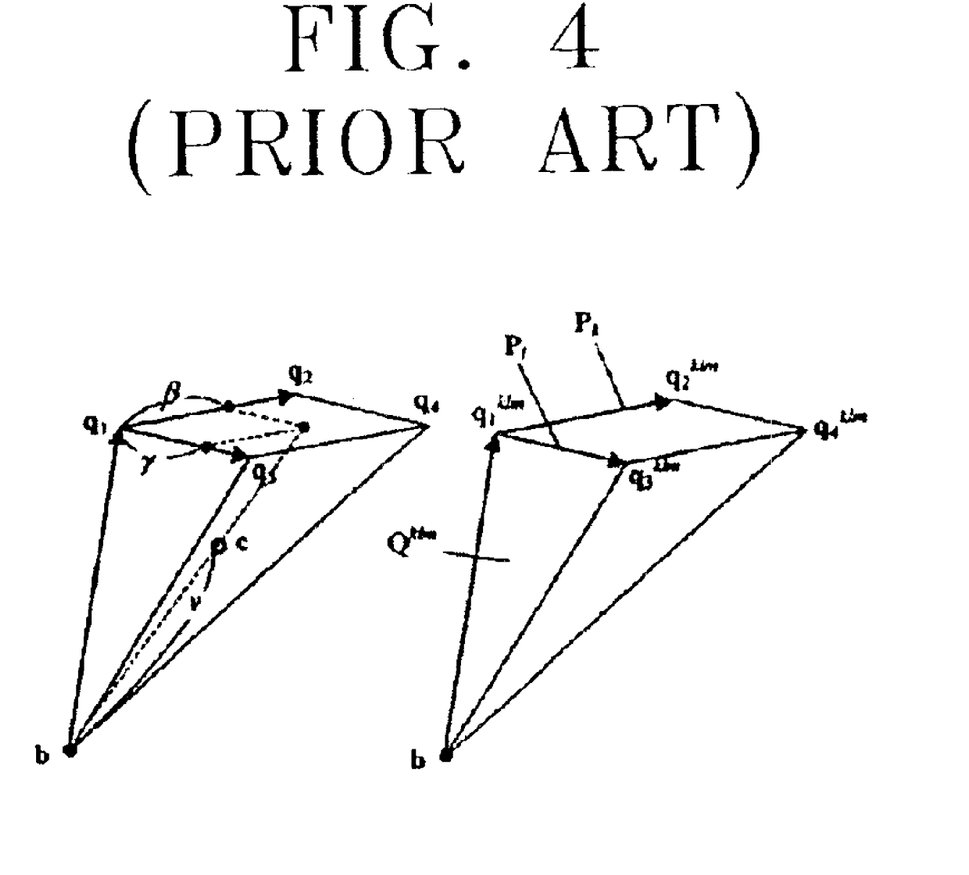

The color signal conversion unit 10 converts the input color signal into an xy color signal in the CIE-XYZ color space. The xy color signal converted in the color signal conversion unit 10 is inputted in the 2D-LUT memory 20. As shown in FIG. 2, stored in the 2D-LUT memory 20 is 2D-LUT data corresponding to a range of the color gamut of the input color signal, and the 2D-LUT data is transferred to the matrix coefficient selection unit 30, and then a matrix coefficient corresponding to the color gamut is calculated. The matrix coefficient calculated in the matrix coefficient selection unit 30 is transferred to the matrix processing unit 40, and a control vector $C_L$ corresponding to the input color signal is outputted through vector processing procedures as shown in FIG. 3. Here, in a polyhedron corresponding to a color gamut of an MPD as shown in FIG. 4, each area shown in FIG. 2 corresponds to a boundary area of all the color gamut capable of belonging to every plane of a polyhedron excluding a black point b when the black point b forms a vertex, that is, a pyramid including a plane formed when four vertices are connected.

However, there exists a problem in that such a conventional method requires the 2D-LUT data to be calculated in advance according to the characteristics of every system for a corresponding matrix coefficient selection and a 2D-LUT memory is needed to store the 2D-LUT data. Further, there exists a problem in that quantization errors may occur during a process for calculating the 2D-LUT data, and the 2D-LUT memory should be so large enough in size that a corresponding matrix coefficient can be selected without errors at boundaries of a corresponding area.

SUMMARY OF THE INVENTION

Therefore, the present invention provides a color signal processing apparatus and method capable of precisely and efficiently calculating an MPD control vector corresponding to an input color signal given to reproduce the standard color signal on an MDP using four or more primary colors without use of a LUT memory.

In order to achieve the above aspect, a color signal processing apparatus according to an exemplary embodiment of the present invention calculates a control vector that is a driving signal of a multi-primary display (MPD) corresponding to an input color signal in order to reproduce the input color signal on the MPD using at least four primary colors, and comprises an XYZ color signal conversion unit for converting the input color signal into an XYZ color signal of a CIE-XYZ color space for an output; a parallel processing unit for obtaining a polyhedron corresponding to a color gamut of the MPD in the CIE-XYZ color space based on linear control vectors forming a control vector, dividing the polyhedron into plural pyramids, and outputting intermediate values for calculating the control vector based on the plural pyramids; a restriction condition checking unit for outputting a valid value satisfying a physical restriction condition out of the calculated intermediate values, and outputting an index for a pyramid for which the valid value is calculated; a pattern arrangement unit for outputting channel information on the control vector corresponding to the index; and a control vector arrangement unit for calculating the control vector based on the channel information and the valid value. At this time, a Forward Model is expressed in the following equation:

$$\begin{pmatrix} X \\ Y \\ Z \end{pmatrix} = \begin{pmatrix} X1 & X2 & \cdots & Xp \\ Y1 & Y2 & \cdots & Yp \\ Z1 & Z2 & \cdots & Zp \end{pmatrix} \begin{pmatrix} C_{L1} \\ C_{L2} \\ \cdots \\ C_{L3} \end{pmatrix}$$

where, (X,Y,Z) denotes the XYZ color signal, p denotes the number of primary colors in the MPD, and $C_{Li}$ denotes a linear control vector.

The pyramid has each plane of the polyhedron as a base plane and a black point as a vertex of the pyramid, and the intermediate values are preferably values of $(\alpha, \beta, \gamma)$ capable of representing the XYZ color signal with reference to a vector representing a vertex of the pyramid.

In another embodiment of the present invention, the parallel processing unit has the number of processors corresponding to the number of pyramids, and each processor simultaneously calculates the values of $(\alpha, \beta, \gamma)$ in parallel with reference to a corresponding pyramid. Further, the restriction condition checking unit preferably selects as the valid value a value satisfying conditions of $0 \leq \alpha \leq .1$, $0 \leq \beta \leq 1$, and $0 \leq \gamma \leq 1$, and condition of $\beta \leq \alpha$ and $\gamma \leq \alpha$, out of the intermediate values.

In another embodiment of the present invention, the color signal processing apparatus further comprises a linear correction unit for linearly correcting a non-linear standard RGB color signal into a standard RGB color signal and providing the corrected standard RGB color signal as the input color signal, and a gamma correction unit for gamma-correcting and outputting the control vector.

A color signal processing method according to an embodiment of the present invention calculates a control vector that is a driving signal of a multi-primary display (MPD) corresponding to an input color signal in order to reproduce the input color signal on the MPD using at least four primary colors, and comprises steps of converting the input color signal into an XYZ color signal of a CIE-XYZ color space for an output; obtaining a polyhedron corresponding to a color gamut of the MPD in the CIE-XYZ color space based on linear control vectors forming the control vector, dividing the polyhedron into plural pyramids, and outputting intermediate values for calculating the control vector based on the plural pyramids; outputting a valid value satisfying a physical restriction condition out of the calculated intermediate values, and outputting an index for a pyramid for which the valid value is calculated; outputting channel information on the control vector corresponding to the index; and calculating the control vector based on the channel information and the yalid value. At this time, a Forward Model is expressed in the following equation:

$$\begin{pmatrix} X \\ Y \\ Z \end{pmatrix} = \begin{pmatrix} X1 & X2 & \ldots & Xp \\ Y1 & Y2 & \ldots & Yp \\ Z1 & Z2 & \ldots & Zp \end{pmatrix} \begin{pmatrix} C_{L1} \\ C_{L2} \\ \ldots \\ C_{L3} \end{pmatrix}$$

where, (X,Y,Z) denotes the XYZ color signal, p denotes the number of primary colors in the MPD, and $C_{Li}$ denotes a linear control vector.

The pyramid has each plane of the polyhedron as a base plane and a black point as a vertex of the pyramid, and, preferably, the intermediate values are values of $(\alpha, \beta, \gamma)$ capable of representing the XYZ color signal with reference to a vector representing a vertex of the pyramid.

In another embodiment of the present invention, the step of calculating the intermediate values simultaneously calculates the values of $(\alpha, \beta, \gamma)$ in parallel. Further, the step of outputting the index preferably selects as the valid value a value satisfying conditions of $0 \leq \alpha \leq 1$, $0 \leq \beta \leq 1$, and $0 \leq \gamma \leq 1$, and condition of $\beta \leq \alpha$ and $\gamma \leq \alpha$, out of the intermediate values.

In another embodiment of the present invention, the color signal processing method further comprises a step of linearly correcting a non-linear standard RGB color signal into a standard RGB color signal and providing the corrected standard RGB color signal as the input color signal, and a step of gamma-correcting and outputting the control vector.

BRIEF DESCRIPTION OF THE DRAWINGS

The invention will be described in detail with reference to the following drawings in which like reference numerals refer to like elements, and wherein.

DETAILED DESCRIPTION OF THE ILLUSTRATIVE, NON-LIMITING EMBODIMENTS

Hereinafter, the illustrative, non-limiting embodiments of the present invention will be described in detail with reference to the accompanying drawings.

Figure 5:
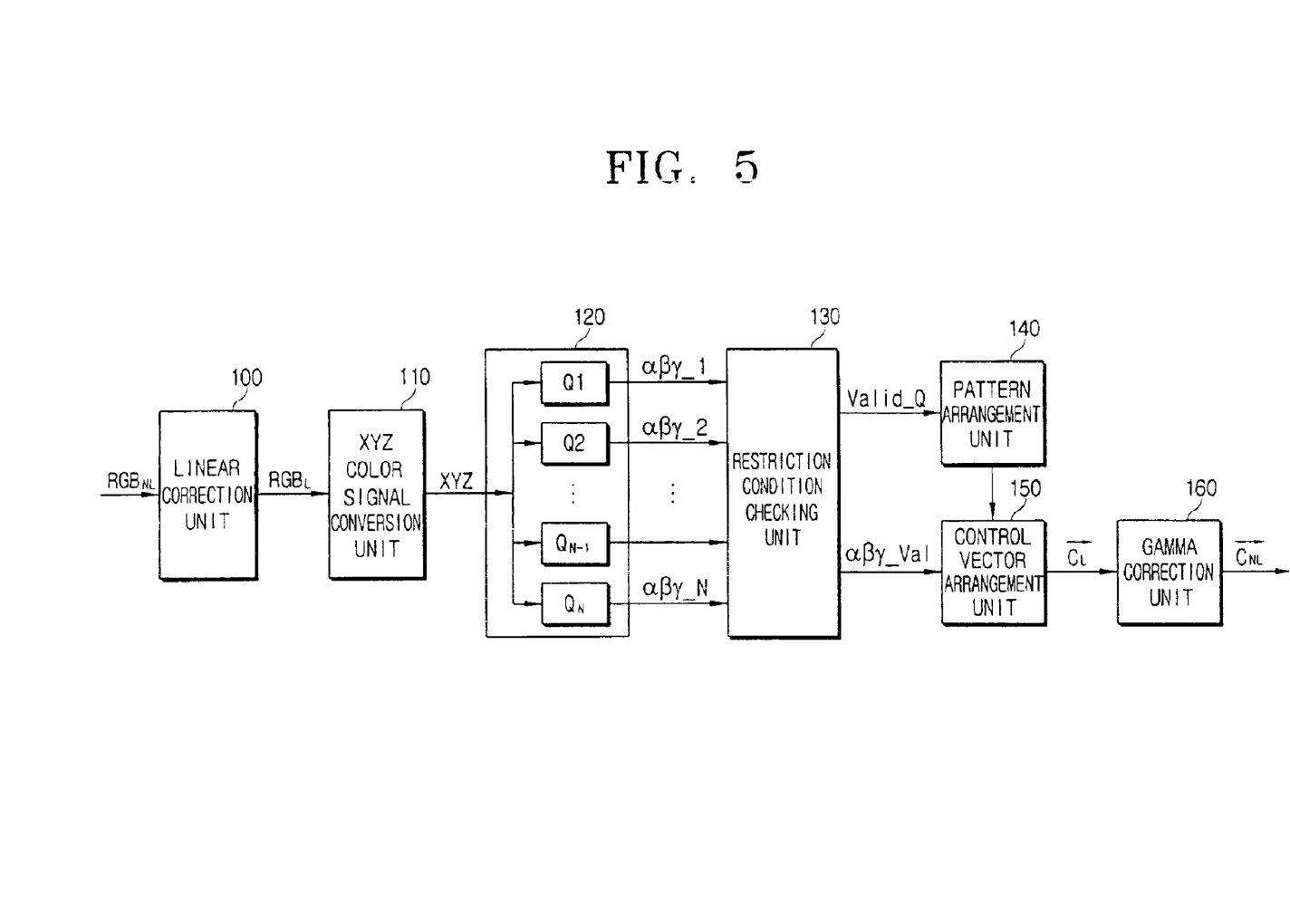
FIG. 5 is a block diagram for showing a color signal processing apparatus according to an embodiment of the present invention.

FIG. 5 is a block diagram of a color signal conversion apparatus according to an embodiment of the present invention. In FIG. 5, the color signal conversion apparatus has a linear correction unit 100, an XYZ color signal conversion unit 110, a parallel processing unit 120, a restriction condition checking unit 130, a pattern arrangement unit 140, a control vector arrangement unit 150, and a gamma correction unit 160.

The linear correction unit 100 linearly corrects an input standard non-linear RGB color signal into an RGB color signal. The standard non-linear RGB color signal refers to diverse color signals compliant to their respective standard specifications, for which there are the International Electro-Technical commission(IEC) sRGB, the non-linear RGB signal compliant to the HDTV standard ITU-R.BT.709, and so on. The XYZ color signal conversion unit 110 converts a linear RGB color signal corrected and outputted in the linear correction unit 100 into an XYZ color signal of the CIE-XYZ color space.

The parallel processing unit 120 consists of N matrix processors $Q_1, Q_2, \ldots,$ and $Q_N$, and the matrix processors $Q_1$ to $Q_N$ simultaneously calculate intermediate values $\alpha\beta\gamma\_1, \alpha\beta\gamma\_2, \ldots,$ and $\alpha\beta\gamma\_N$ for control vector calculations. The restriction condition checking unit 130 checks physical restriction conditions with respect to the values $\alpha\beta\gamma\_1$ to $\alpha\beta\gamma\_N$ calculated in the parallel processing unit 120, and outputs values satisfying the restriction conditions out of the values $\alpha\beta\gamma\_1$ to $\alpha\beta\gamma\_N$ as a $\alpha\beta\gamma\_$Val signal and a Valid_Q signal which is an index signal for a corresponding matrix processor. The pattern arrangement unit 140 transfers to the control vector arrangement unit 150 channel information on to which channel of control vectors the $\alpha\beta\gamma\_$Val signal corresponds with reference to the Valid_Q signal outputted from the restriction condition checking unit 130. The control vector arrangement unit 150 refers to the channel information transferred from the pattern arrangement unit 140, assigns the $\alpha\beta\gamma\_$Val signal to a corresponding channel, and calculates the control vector $C_L$.

Further, the gamma correction unit 160 performs a reverse direction non-linear correction, that is, a gamma correction to offset the non-linear electro-optical characteristics of an MPD, and outputs a final control vector $C_{ML}$.

Figure 6:
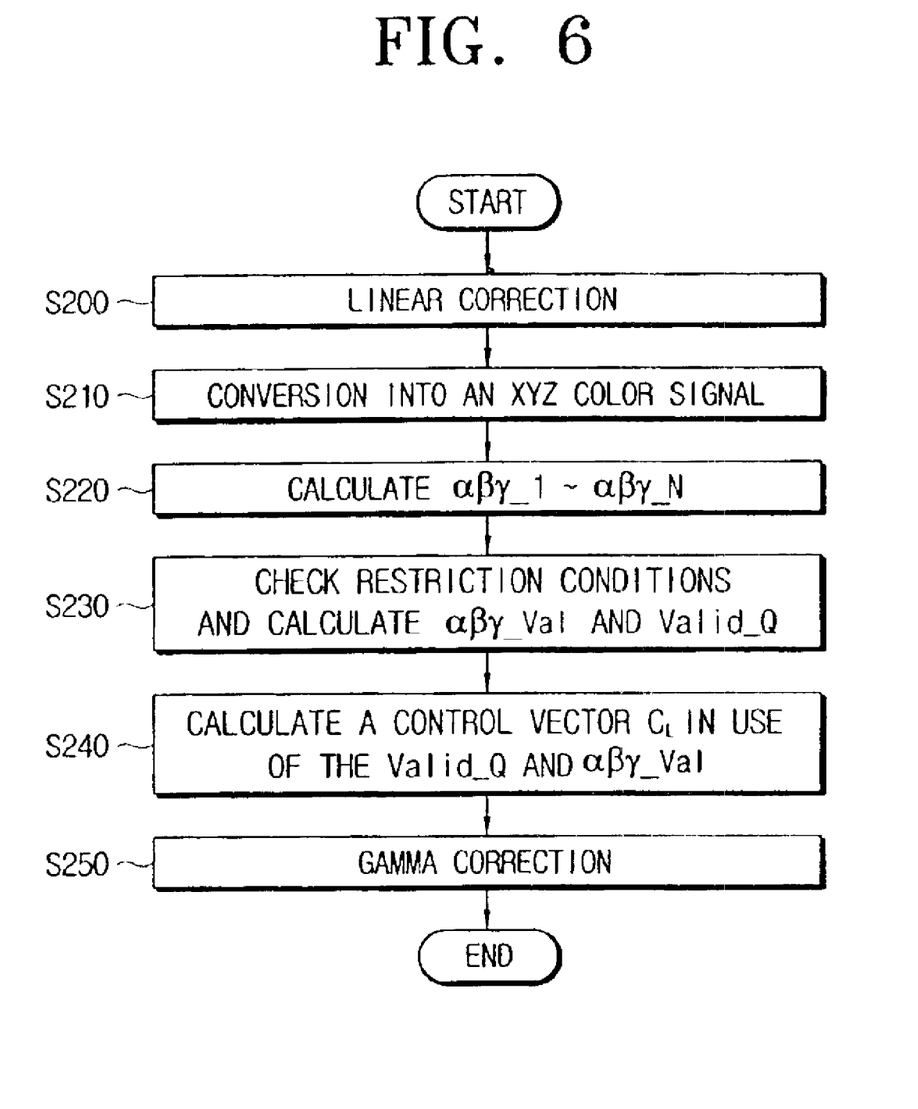
FIG. 6 is a flow chart for explaining operations of the color signal processing apparatus of FIG. 5.

FIG. 6 is a flow chart for explaining operations of a color signal conversion apparatus according to an embodiment of the present invention. The operations of the color signal conversion apparatus according to the embodiment of the present invention are described as follows with reference to FIG. 5 and FIG. 6. First, the linear correction unit 100 linearly corrects an input standard non-linear RGB color signal $RGB_{ML}$ into a linear RGB color signal $RGB_L$ (S200). The linear RGB color signal $RGB_L$ corrected and outputted from the linear correction unit 100 is transferred to the XYZ color signal conversion unit 110, and converted into an XYZ color signal XYZ of the CIE-XYZ color space (S210).

The XYZ color signal converted in the XYZ color signal conversion unit 110 is transferred to the parallel processing unit 120, and the intermediate values $\alpha\beta\gamma\_to\ \alpha\beta\gamma\_N$ are simultaneously calculated to calculate a control vector through the N matrix processors $Q_1$ to $Q_N$ (S220).

The intermediate values $\alpha\beta\gamma\_1$ to $\alpha\beta\gamma\_N$ can be calculated through a following process. That is, the Forward Model for an MPD having the number of p channels can be generally defined in the linear control vector $C_L$ and a pXT matrix as expressed in Equation 1 as follows:

$$\begin{pmatrix} X \\ Y \\ Z \end{pmatrix} = \begin{pmatrix} X1 & X2 & \ldots & Xp \\ Y1 & Y2 & \ldots & Yp \\ Z1 & Z2 & \ldots & Zp \end{pmatrix} \begin{pmatrix} C_{L1} \\ C_{L2} \\ \ldots \\ C_{L3} \end{pmatrix} \quad \text{[Equation 1]}$$

wherein, p denotes the number of primary colors, that is, the number of channels indicating linear control vectors $C_{Li}$, in an MPD.

Figure 7A:
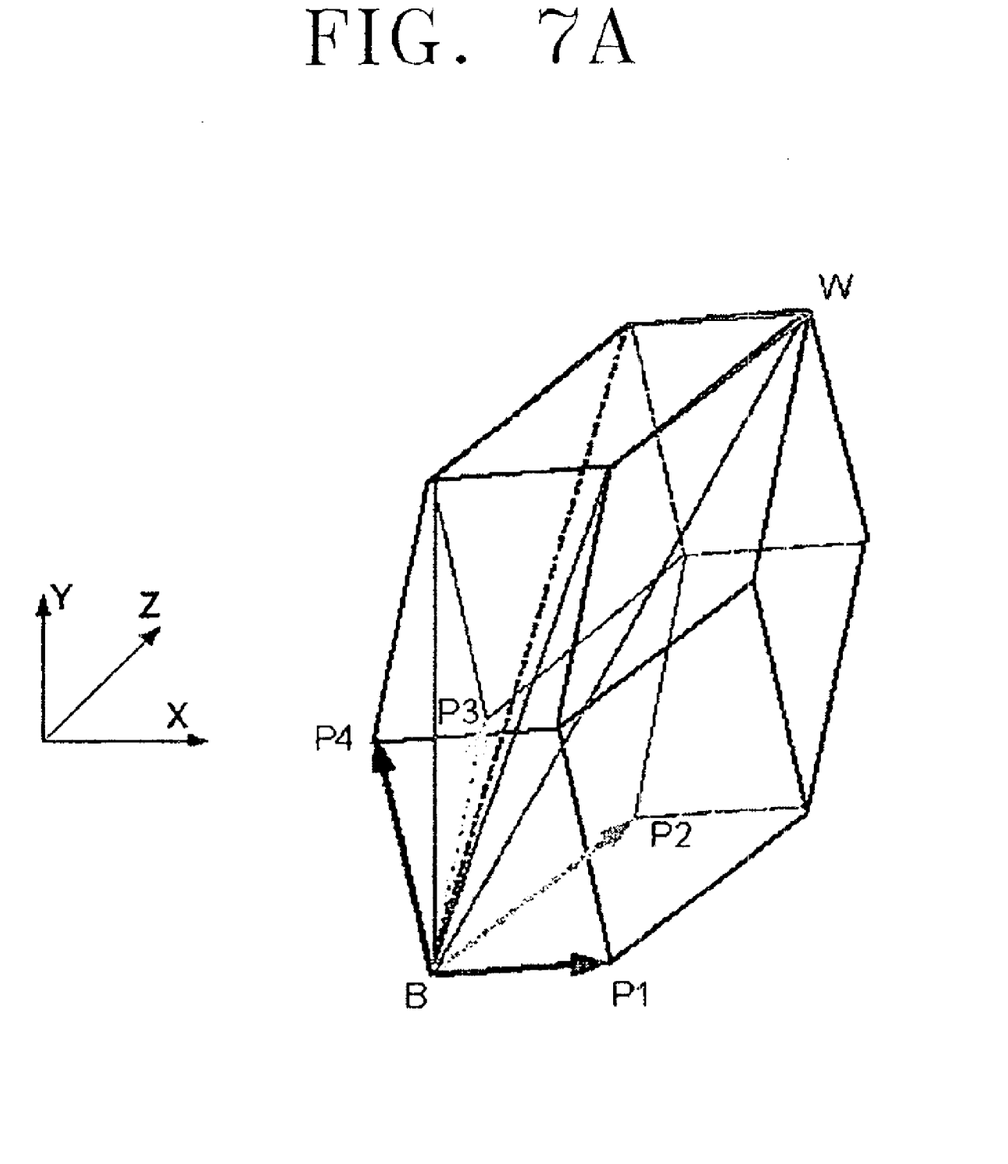
FIGS. 7A to 7C are views for explaining operations of the color signal processing apparatus of FIG. 5.
Figure 7B:
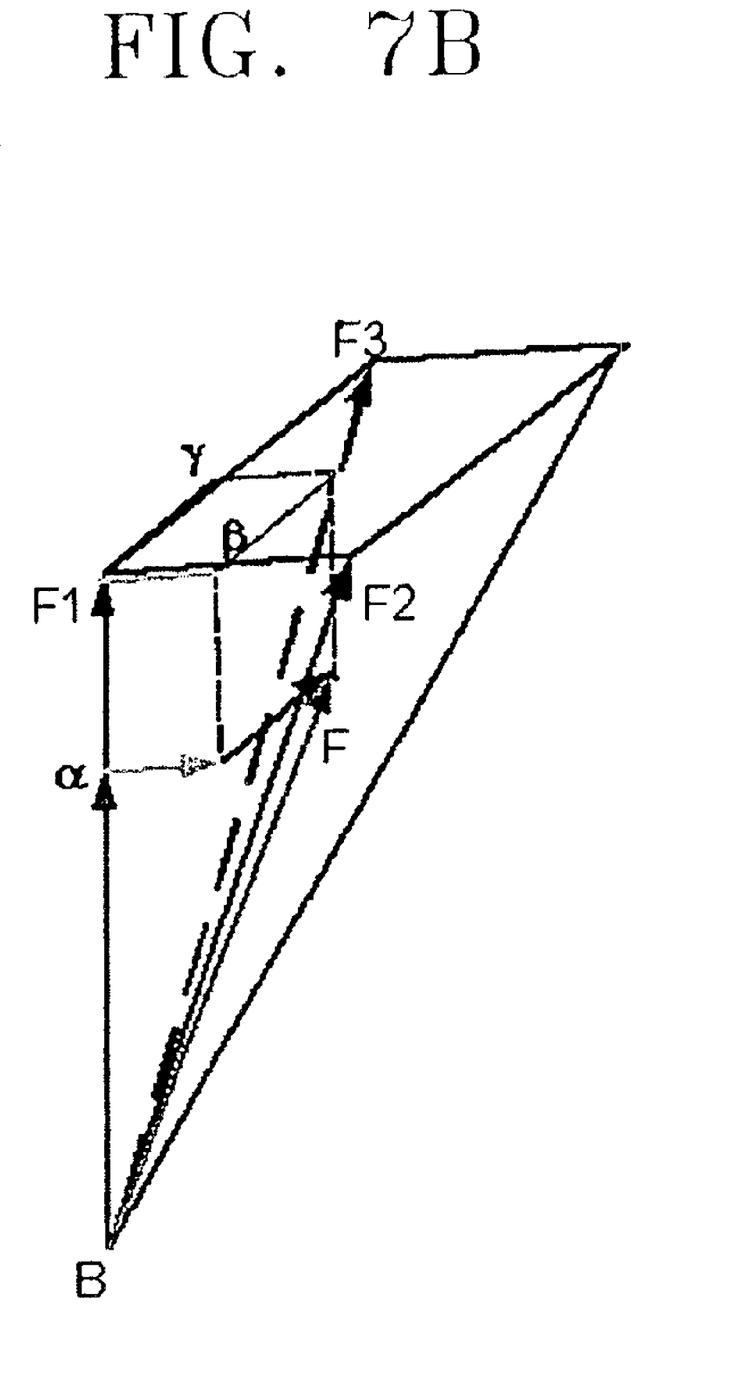

Through the combination of all the linear control vectors $C_{Li}$, a 3D XYZ color gamut for the MPD can be obtained from such a Forward Model, as shown in FIG. 7A. FIG. 7A shows a case of p=4, for example. However, when the control vector $C_L$ corresponding to a given XYZ color signal is found using Equation 1, a conversion matrix does not have an inverse matrix since the conversion matrix is not a square matrix. That is, plural control vectors exist with respect to a given XYZ color signal. Mathematically, a virtual inverse matrix can be obtained through a regression analysis or other methods, but values obtained by doing so may exceed the physical restriction range, so the solution obtained in the entire XYZ color gamut does not satisfy all the restriction conditions. Accordingly, in order to obtain a unique control vector for a given XYZ color signal, as shown in FIG. 7B, it may be considered to divide the 3D XYZ color gamut for an MPD into pyramids each having a plane as its base plane and a black point as its vertex and then to calculate the unique control vector through a vector process at each pyramid. In this case, there still remain problems of how many pyramids exist in the 3D XYZ color gamut for an MPD and what a control vector corresponding to each vertex is. In order to solve the problems, a graph theory can be used, as shown in FIG. 8 and FIG. 9.

Figure 8:
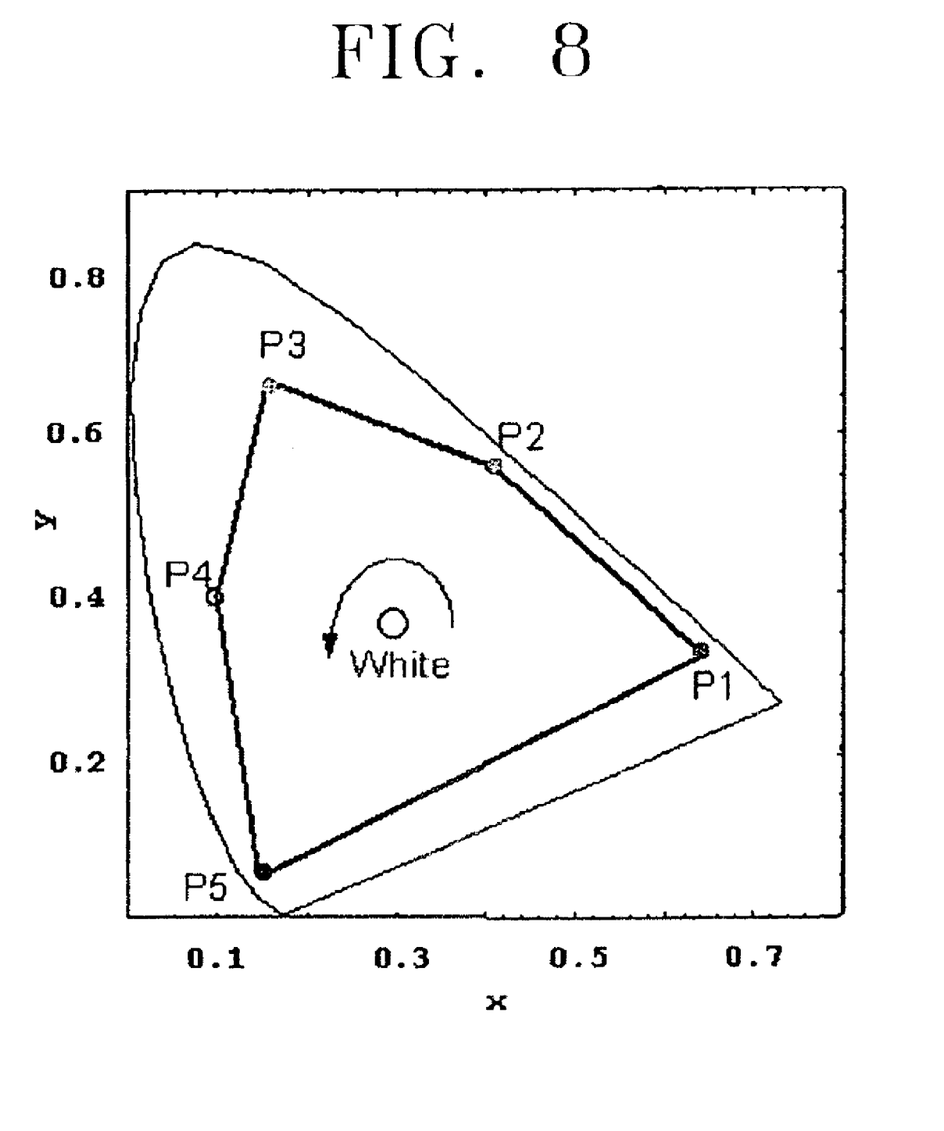
FIG. 8 and FIG. 9 are views for explaining a graph theory applied to the color signal processing apparatus of FIG. 5.
Figure 9:
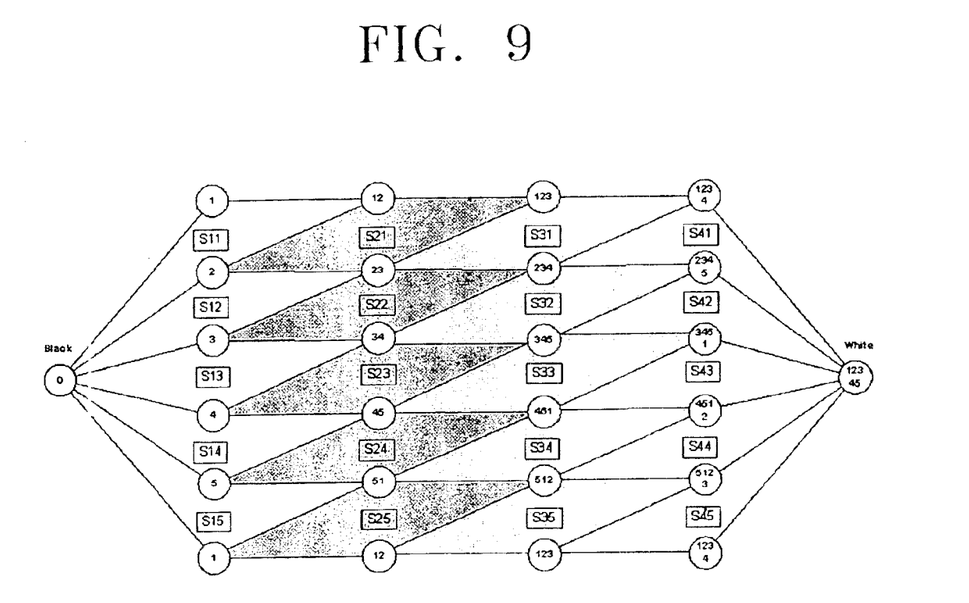

That is, as shown in FIG. 8, if there are five channels P1, P2, . . . , and P5 for an MPD, the five channels P1 to P5 are arranged in the clockwise or counterclockwise direction about the white point, as arranged nodes having numbers 1, 2, 3, 4, 5, and 1 shown in FIG. 9. Here, the numbers in the nodes indicates channels each having the maximum control value of "1" That is, a case of the node having a value of "1" indicates the control vector $C_L$=(1, 0, 0, 0, 0), and a case of the node having a value of "123" indicates the control vector $C_L$=(1, 1, 1, 0, 0).

The numbers in the nodes for the next level are obtained through combining the numbers of first-level nodes with the numbers of neighboring nodes in the immediately preceding levels. For example, the number of "12" is formed through a combination of "1" and "2," and the number of "23" is formed through a combination of "2" and "3." Through such a process, the nodes are combined and leveled up to the number "12345," that is, white, which is the case that all five channels become "1," so that the entire graph is completed.

The nodes denote the vertices of planes in the 3D XYZ color gamut for the MPD, and a plane formed through connecting neighboring four vertices becomes a plane in the 3D XYZ color gamut for the MPD. Accordingly, if n primary colors are used, there exist a total of [n(n−2)+2] plane vertices and n(n−2) planes S11 to S45. If the entire 3D XYZ color gamut for the MPD is divided into pyramids and the black point is taken as a vertex for all the pyramids, the planes S11 to S14 which are surfaces corresponding to the base planes of pyramids are excluded since the black point is included. Accordingly, the number of the pyramids amounts to n(n−2), excluding the planes S11 to S14. Further, the XYZ color signal values corresponding to the respective vertices are corresponding control vectors in the nodes, and can be calculated using Equation 1.

If a given control vector F=(X, Y, Z) exists in an area of a certain pyramid as shown in FIG. 7B, the given control vector can be expressed as a vector in Equation 2 as follows:

$$F = \alpha \cdot F1 + \beta \cdot (F2 - F1) + \gamma \cdot (F3 - F1) \quad \text{[Equation 2]}$$

$$F = (X, Y, Z)$$

$$F_i = (X_i, Y_i, Z_i) \text{[Equation]} 2$$

Here, F2−F1 and F3−F1 each have only one value of F1~F5, that is, one of the basic primary color vectors of the MPD, depending on a corresponding pyramid, as shown in FIG. 9. Further, Equation 2 selects three specific vertices except for the vertex F4 out of the four vertices of the base plane, but the same result can be obtained when two arbitrary vertices including the vertex F4 are selected.

Further, Equation 3 can be obtained when the three linear equations in Equation 3 are developed with respect to $\alpha, \beta,$ and $\gamma$.

$$\alpha = \frac{\begin{array}{c} X31Y21Z - X21Y31Z - X31YZ21 + \\ XY31Z21 + X21YZ31 - XY21Z31 \end{array}}{\begin{array}{c} -X31Y21Z1 + X21Y31Z1 + X31Y1Z21 - \\ X1Y31Z21 - X21Y1Z31 + X1Y21Z31 \end{array}} \quad \text{[Equation 3]}$$

$$\beta = \frac{\begin{array}{c} -X31Y1Z + X1Y31Z + X31YZ1 - \\ XY31Z1 - X1YZ31 + XY1Z31 \end{array}}{\begin{array}{c} -X31Y21Z1 + X21Y31Z1 + X31Y1Z21 - \\ Z1Y31Z21 - X21Y1Z31 + X1Y21Z31 \end{array}}$$

$$\gamma = \frac{\begin{array}{c} -X21Y1Z + X1Y21Z + X21YZ1 - \\ XY21Z1 - X1YZ21 + XY1Z21 \end{array}}{\begin{array}{c} X31Y21Z1 - X21Y31Z1 - X31Y1Z21 + \\ X1Y31Z21 + X21Y1Z31 - X1Y21Z31 \end{array}}$$

In case that an actual control vector $C_L$=($CL_1, CL_2, \ldots, CL_P$) is obtained from the $\alpha, \beta,$ and $\gamma$ values calculated in Equation 3, vector values corresponding to the vectors F1 to F3 are needed, and the vector values can be calculated in advance through the Forward Model of Equation 1.

For example, if F1 is a value at $C_{F1}$=(1, 0, 0, 0, 0), F2 is a value at $C_{F2}$=(1, 1, 0, 0, 0), F3 is a value at $C_{F3}$=(1, 0, 0, 0, 1), and the black point B is a value at $C_{FB}$=(0, 0, 0, 0, 0), the control vector affecting the scalar quantity of the vector F1 is determined by the $C_{FB}$ and $C_{F1}$, so that α becomes the scalar quantity of $C_{L1}$, β becomes the scalar quantity of $C_{L2}$, γ becomes the scalar quantity of $C_{L5}$, and the other components are dealt with as zero. Accordingly, a control vector value for a given XYZ color signal vector becomes equal to $C_L$=(α, β, 0, 0, γ).

In case of α, various channel values are expressed depending upon a corresponding node F1. For example, a pyramid connecting the plane S42 with the plane S42 in FIG. 9 is expressed as $C_L$=(γ, β, α, α, α). Through such a process, the parallel matrix processing unit 120 obtains (α, β, γ)'s amounting to N=p(p−2), that is, αβγ_1 to αβγ_N.

The restriction condition checking unit 130 checks restriction conditions for αβγ_1 to αβγ_N calculated in the parallel processing unit 120, and calculates the Valid_Q and αβγ_val (S230). At this time, the first restriction condition is a physical range that the (α,β,γ) can have, which can be expressed in Equation 4 as follows:

$$0 \leq \alpha \leq 1, 0 \leq \beta \leq 1, 0 \leq \gamma \leq 1 \quad \text{[Equation 4]}$$

Figure 7C:
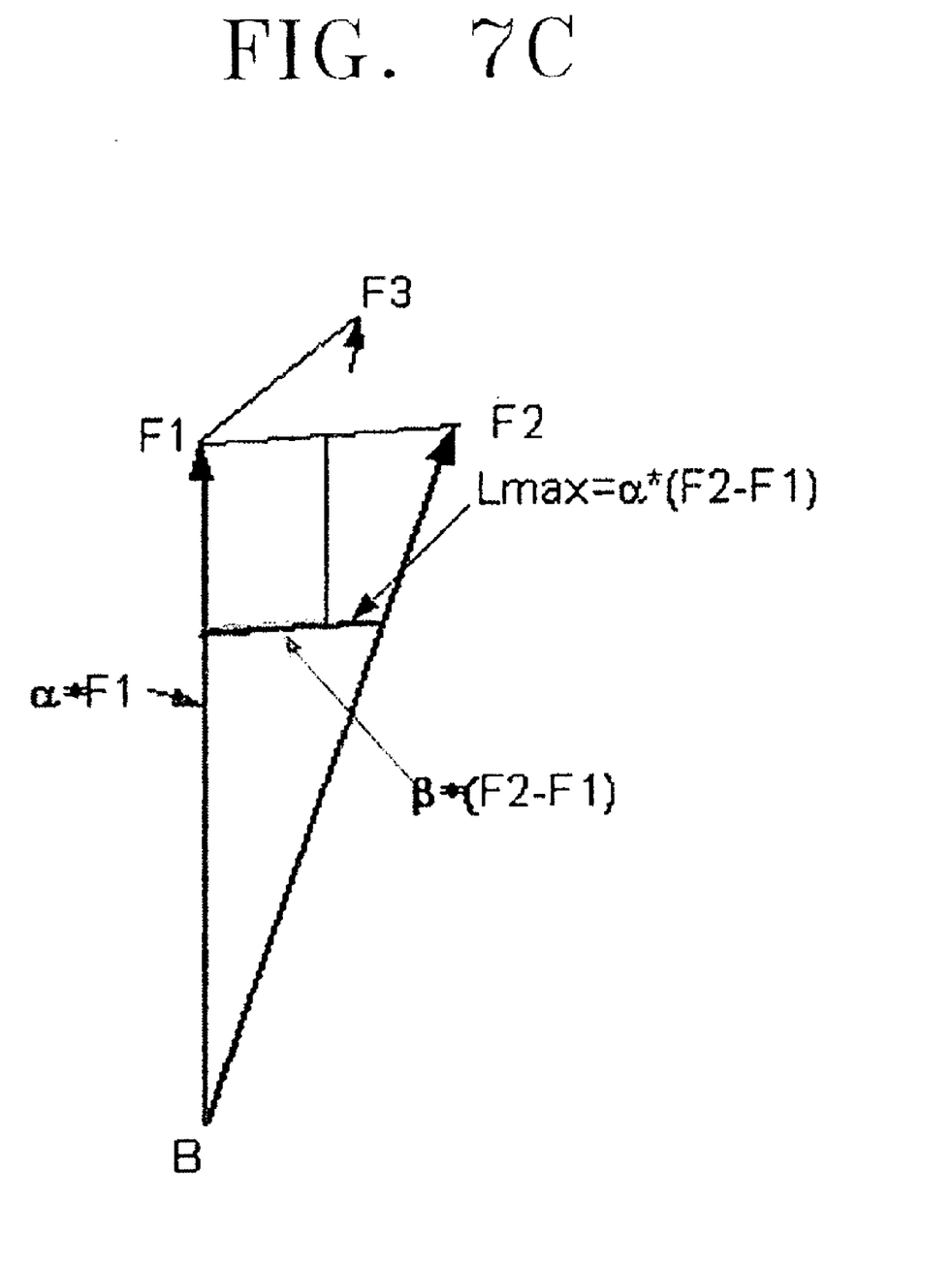

However, since there can be one or more occasions simply satisfying the condition of Equation 4, an additional condition is needed to find out a control vector value existing inside a pyramid. The condition that each component vector (αF1, (F2−F1), (F3−F1)) based on the calculated (α, β, γ) exists in a pyramid should meet the condition of a proportional expression shown in FIG. 7C. That is, the condition of Equation 5 as follows can be obtained from the condition of β*(F2−F1)≦L max.

$$\beta \leq \alpha \text{ and } \gamma \leq \alpha \quad \text{[Equation 5]}$$

In general, there exists only one solution to (α, β, γ) satisfying all the conditions of Equation 4 and Equation 5. Even though four solutions at maximum are given if an input control vector XYZ is positioned on boundary planes of a pyramid, the values of all the (α, β, γ) are the same so that any of the values can be selected.

The Valid_Q that is pyramid index information calculated in the restriction condition checking unit 130 is transferred to the pattern arrangement unit 150, and the αβγ_Val is transferred to the control vector arrangement unit 150. The pattern arrangement unit 140 has channel information on to which channel of respective control vectors the Valid_Q signal belongs, and provides the channel information to the control vector arrangement unit 150. The control vector arrangement unit 150 assigns the αβγ_Val to a corresponding channel, and calculates the control vector CL (S240).

The gamma correction unit 160 receives the linear control vector $C_L$ calculated in the control vector arrangement unit 150, performs the gamma correction taking into consideration the electro-optical characteristics of the respective actual channels that the MPD has, and finally outputs the non-linear control vector $C_{NL}$ (S250). Through the above process, a control vector for an MPD corresponding to an input XYZ color signal can be calculated, and a color signal inputted to the MPD can be displayed using the calculated non-linear control vector $C_{NL}$.

As described above, the present invention can calculate a control vector that is a driving signal of an MPD corresponding to an input color signal, so that the input color signal can be reproduced on the MPD using four or more primary colors. Further, the color signal processing apparatus according to the present invention does not need an LUT memory different from the conventional color signal processing apparatus, and lowers the possibility of errors at boundary planes.

Although the exemplary embodiments of the present invention has been described, it will be understood by those skilled in the art that the present invention should not be limited to the described exemplary embodiments, but various changes and modifications can be made within the spirit and scope of the present invention as defined by the appended claims.

What is claimed is:

1. A color signal processing apparatus for calculating a control vector that is a driving signal of a multi-primary display (MPD) corresponding to an input color signal in order to reproduce the input color signal on the MPD using at least four primary colors, comprising:

an XYZ color signal conversion unit for converting the input color signal into an XYZ color signal of a CIE-XYZ color space for an output;

a parallel processing unit for obtaining a polyhedron corresponding to a color gamut of the MPD in the CIE-XYZ color space based on an MPD Forward Model, dividing the polyhedron into plural pyramids, and outputting intermediate values for calculating the control vector based on the plural pyramids;

a restriction condition checking unit for outputting a valid value satisfying a physical restriction condition out of the calculated intermediate values, and outputting an index for a pyramid for which the valid value is calculated;

a pattern arrangement unit for outputting channel information on the control vector corresponding to the index; and a control vector arrangement unit for calculating the control vector based on the channel information and the valid value.

2. The color signal processing apparatus as claimed in claim 1, wherein the Forward Model is expressed as follows:

$$\begin{pmatrix} X \\ Y \\ Z \end{pmatrix} = \begin{pmatrix} X1 & X2 & \cdots & Xp \\ Y1 & Y2 & \cdots & Yp \\ Z1 & Z2 & \cdots & Zp \end{pmatrix} \begin{pmatrix} C_{L1} \\ C_{L2} \\ \cdots \\ C_{Li3} \end{pmatrix}$$

where, (X,Y,Z) denotes the XYZ color signal, p denotes the number of primary colors in the MPD, and $C_{L1}$ denotes a linear control vector.

3. The color signal processing apparatus as claimed in claim 2, wherein the pyramid has each plane of the polyhedron as a base plane and a black point as a vertex of the pyramid.

4. The color signal processing apparatus as claimed in claim 3, wherein the intermediate values are values of (α, β, γ) capable of representing the XYZ color signal with reference to a vector representing a vertex of the pyramid.

5. The color signal processing apparatus as claimed in claim 4, wherein the parallel processing unit has a number of processors corresponding to the number of pyramids, and each processor simultaneously calculates the values of (α, β, γ) in parallel with reference to a corresponding pyramid.

6. The color signal processing apparatus as claimed in claim 5, wherein the restriction condition checking unit selects as the valid value a value satisfying conditions of 0≦α≦1, 0≦β≦1, 0≦γ≦1, β≦α and γ≦α, out of the intermediate values.

7. The color signal processing apparatus as claimed in claim 1, further comprising a linear correction unit for linearly correcting a non-linear standard RGB color signal into a standard RGB color signal and providing the corrected standard RGB color signal as the input color signal.

8. The color signal processing apparatus as claimed in claim 1, further comprising a gamma correction unit for gamma-correcting and outputting the control vector.

9. A color signal processing method for calculating a control vector that is a driving signal of a multi-primary display (MPD) corresponding to an input color signal in order to reproduce the input color signal on the MPD using at least four primary colors, comprising steps of:

converting the input color signal into an XYZ color signal of a CIE-XYZ color space for an output;

obtaining a polyhedron corresponding to a color gamut of the MPD in the CIE-XYZ color space based on an MPD Forward Model, dividing the polyhedron into plural pyramids, and outputting intermediate values for calculating the control vector based on the plural pyramids;

outputting a valid value satisfying a physical restriction condition out of the calculated intermediate values, and outputting an index for a pyramid for which the valid value is calculated;

outputting channel information on the control vector corresponding to the index; and calculating the control vector based on the channel information and the valid value.

10. The color signal processing method as claimed in claim 9, wherein the Forward Model is expressed as follows:

$$\begin{pmatrix} X \\ Y \\ Z \end{pmatrix} = \begin{pmatrix} X1 & X2 & \cdots & Xp \\ Y1 & Y2 & \cdots & Yp \\ Z1 & Z2 & \cdots & Zp \end{pmatrix} \begin{pmatrix} C_{L1} \\ C_{L2} \\ \cdots \\ C_{Li3} \end{pmatrix}$$

where, (X,Y,Z) denotes the XYZ color signal, p denotes the number of primary colors in the MPD, and $C_{Li}$, denotes a linear control vector.

11. The color signal processing method as claimed in claim 10, wherein the pyramid has each plane of the polyhedron as a base plane and a black point as a vertex of the pyramid.

12. The color signal processing method as claimed in claim 11, wherein the intermediate values are values of ($\alpha$, $\beta$, $\gamma$) capable of representing the XYZ color signal with reference to a vector representing a vertex of the pyramid.

13. The color signal processing method as claimed in claim 12, wherein the step of calculating the intermediate values simultaneously calculates the values of ($\alpha$, $\beta$, $\gamma$) in parallel.

14. The color signal processing method as claimed in claim 13, wherein the step of outputting the index selects as the valid value a value satisfying conditions of $0 \leq \alpha \leq 1$, $0 \leq \beta \leq 1$, $0 \leq \gamma \leq 1$, $\beta \leq \alpha$ and $\gamma \leq \alpha$, out of the intermediate values.

15. The color signal processing method as claimed in claim 9, further comprising a step of linearly correcting a non-linear standard RGB color signal into a standard RGB color signal and providing the corrected standard RGB color signal as the input color signal.

16. The color signal processing method as claimed in claim 9, further comprising a step of gamma-correcting and outputting the control vector.

* * * * *